United States Patent
Spitz et al.

(10) Patent No.: US 12,400,178 B2
(45) Date of Patent: Aug. 26, 2025

(54) PROVISIONING CONTROL APPARATUS, SYSTEM AND METHOD

(71) Applicant: Secure Thingz Ltd., Cambridge (GB)

(72) Inventors: Stephan Spitz, Karlsfeld (DE); Tim Woodruff, Cambridge (GB); Tim Hoole, Foxton (GB); Andrew Bott, Cambridge (GB)

(73) Assignee: SECURE THINGZ LTD., Cambridge (GB)

( * ) Notice: Subject to any disclaimer, the term of this patent is extended or adjusted under 35 U.S.C. 154(b) by 0 days.

(21) Appl. No.: 17/231,243

(22) Filed: Apr. 15, 2021

(65) Prior Publication Data

US 2021/0326801 A1    Oct. 21, 2021

(30) Foreign Application Priority Data

Apr. 17, 2020    (EP) .................................... 20170178

(51) Int. Cl.
*G06Q 10/087* (2023.01)
*G06F 21/10* (2013.01)
(Continued)

(52) U.S. Cl.
CPC ......... *G06Q 10/087* (2013.01); *G06F 21/105* (2013.01); *H04L 9/3213* (2013.01);
(Continued)

(58) Field of Classification Search
None
See application file for complete search history.

(56) References Cited

U.S. PATENT DOCUMENTS 8,694,763 B2 * 4/2014 Thorsen .................. G06F 9/441
                                                                 713/2
9,692,737 B2 * 6/2017 Walters ............... G06Q 10/101
(Continued)

FOREIGN PATENT DOCUMENTS

CN    101563880 A    10/2009
CN    102255917 A    11/2011
(Continued)

OTHER PUBLICATIONS

Extended European Search Report from corresponding European Application No. 20170178.6, Sep. 24, 2020.
(Continued)

*Primary Examiner* — Florian M Zeender
*Assistant Examiner* — Kimberly S. Bursum
(74) *Attorney, Agent, or Firm* — Workman Nydegger

(57) ABSTRACT

A provisioning control apparatus is configured to be coupled to a provisioning equipment server, which is electrically connectable with one or more electronic devices for provisioning the one or more electronic devices with first or second program codes. The provisioning control apparatus comprises: a communication interface configured to receive an electronic credit token having a credit counter; and a processor. The communication interface is configured to transmit the first and second program codes towards the provisioning equipment server. The processor is configured to update a value of the credit counter for each transmission of the first and second program codes to obtain an updated credit counter, and to prohibit a further transmission of the first or second program codes if the updated credit counter indicates that a number of transmissions is reached. A provisioning control system comprises the apparatus and a corresponding method for provisioning one or more electronic devices.

20 Claims, 4 Drawing Sheets

(51) Int. Cl.
 *H04L 9/32* (2006.01)
 *H04L 9/40* (2022.01)
 *H04L 41/0803* (2022.01)
 *H04W 12/30* (2021.01)
(52) U.S. Cl.
 CPC ........ *H04L 9/3247* (2013.01); *H04L 41/0803* (2013.01); *H04L 63/126* (2013.01); *H04W 12/35* (2021.01)

(56) References Cited

U.S. PATENT DOCUMENTS

| | | | |
|---|---|---|---|
| 2007/0213134 A1 | 9/2007 | Aida | |
| 2008/0230601 A1 | 9/2008 | Suzuki et al. | |
| 2009/0300758 A1* | 12/2009 | Hauck | H04L 9/3271 380/283 |
| 2014/0164779 A1* | 6/2014 | Hartley | H04L 9/0866 713/176 |
| 2014/0205092 A1* | 7/2014 | Hartley | H04L 9/0897 380/44 |
| 2014/0233394 A1* | 8/2014 | Viljoen | H04L 45/64 370/236.2 |
| 2016/0174069 A1* | 6/2016 | Bruner | H04L 63/065 455/411 |
| 2018/0227282 A1* | 8/2018 | Lee | H04W 12/10 |
| 2019/0068576 A1 | 2/2019 | Ji et al. | |
| 2019/0334718 A1 | 10/2019 | Li et al. | |

FOREIGN PATENT DOCUMENTS

| | | |
|---|---|---|
| CN | 105516948 A | 4/2016 |
| CN | 107370668 A | 11/2017 |
| CN | 108476226 A | 8/2018 |
| CN | 110191112 A | 8/2019 |
| JP | 2004295823 A * | 10/2004 |

OTHER PUBLICATIONS

Chinese Office Action from Corresponding Chinese Patent Application No. CN202110414156.4, Nov. 20, 2023.

* cited by examiner

PROVISIONING CONTROL APPARATUS, SYSTEM AND METHOD

TECHNICAL FIELD

The invention relates to the secure production and provisioning of electronic devices. More specifically, the invention relates to an apparatus, system and method for controlling the provisioning of electronic devices.

BACKGROUND OF THE INVENTION

The production and assembly of state-of-the-art electronic consumer equipment, such as smartphones, tablet computers as well as other types of IoT devices, often happens in a distributed fashion in that the various electronic components or devices, including the electronic chips or microprocessors of the electronic consumer equipment are manufactured, provisioned or personalized and finally assembled at different locations and by different parties. For instance, an electronic chip or microprocessor for an electronic consumer equipment may be originally manufactured by a chip manufacturer and provisioned by another party with a suitable firmware, before being assembled into the final end product by the manufacturer of the electronic consumer equipment, e.g. an OEM.

For such distributed processing chains of electronic equipment there is a need for apparatuses, systems and methods allowing for a secure and controlled provisioning of electronic components or devices, such as chips or microprocessors of the electronic equipment.

SUMMARY OF THE INVENTION

It is therefore an object of the invention to provide apparatuses, systems and methods allowing for a secure and controlled provisioning of electronic devices, such as chips or microprocessors for electronic equipment.

The foregoing and other objects are achieved by the subject matter of the independent claims. Further implementation forms are apparent from the dependent claims, the description and the figures.

According to a first aspect of the invention a provisioning control apparatus configured to be coupled to a provisioning equipment server is provided, wherein the provisioning equipment server is electrically connectable with one or more electronic devices for provisioning the electronic devices with a first program code or a second program code. The electronic devices may comprise chips, microprocessors or other programmable electronic components, such as Flash memories, electrically erasable programmable read only memories (EEPROM), programmable logic devices (PLDs), field programmable gate arrays (FPGAs), and microcontrollers incorporating non-volatile memory elements. The first program code may be a first firmware originally provided by a first remote server. The second program code may be a second firmware originally provided by a second remote server. The first program code may be provisioned on a first type of electronic devices, while the second program code may be provisioned on a different second type of electronic devices. The first and second program code may be provisioned on the same type of electronic devices, i.e. on the same chip type. The first and second program codes may be digitally signed. The first and second program codes may be personalized first and second program codes in that the personalized first and second program codes can only be used to provision, i.e. personalize one respective electronic device.

The provisioning control apparatus according to the first aspect comprises a communication interface configured to receive an electronic credit token, wherein the electronic credit token comprises a credit counter and wherein the credit counter indicates a total allowed number of transmissions of the first program code and the second program code towards the provisioning equipment server. Moreover, the provisioning control apparatus according to the first aspect comprises a processor configured to retrieve the credit counter from the received electronic credit token. The communication interface is further configured to transmit the first program code and the second program code towards the provisioning equipment server. The processor is further configured to update a value of the credit counter for each transmission of the first program code and of the second program code to obtain an updated credit counter. For instance, the processor may be configured to decrement the credit counter for each respective transmission of the first program code and for each respective transmission of the second program code to the provisioning equipment server. Moreover, the processor is configured to prohibit a further transmission of the first program code or the second program code towards the provisioning equipment server, if the updated credit counter indicates that the total number of transmissions has been reached, for instance, in case the updated credit counter indicates that no allowed transmissions are left, e.g. the updated credit counter has reached zero.

Advantageously, by means of the electronic credit token the provisioning control apparatus has control over the provisioning of the electronic devices by the provisioning equipment server, in particular about how many electronic devices are configured by the provisioning equipment server with the first program code and the second program code. The provisioning control apparatus and the provisioning equipment server may be under the control of different parties. The provisioning equipment server may provision a first type of electronic devices using the first program code for a first party and a second type of electronic devices using the second program code for a second party independent of the first party. Thus, advantageously the provisioning control apparatus using the electronic credit token with its credit counter has control over the provisioning of electronic devices by the provisioning equipment server for different parties, for instance, different electronic equipment manufacturers.

In a further embodiment, the communication interface is configured to receive the electronic credit token over a communication network, such as the Internet, from a remote server or a token generator server. The remote server may be the server of or associated with an electronic equipment manufacturer (herein also referred to as OEM) that uses the electronic devices provisioned with its firmware for assembling electronic equipment, such as smartphones, tablet computers as well as other types of IoT devices. Advantageously, this allows the electronic equipment manufacturer to have control over the provisioning of the electronic devices with its firmware.

In a further embodiment, the communication interface may be configured to communicate with the provisioning equipment server via a wired connection. In an embodiment, the provisioning equipment server may be implemented as a personal computer and the provisioning control apparatus may be implemented as a PC card inserted in the provisioning equipment server.

In a further embodiment, the electronic credit token may comprise provisioning control data for controlling communications with the provisioning equipment server, wherein the processor is configured to retrieve the provisioning control data from the electronic credit token and to control communications of the communication interface with the provisioning equipment server according to the provisioning control data. In an embodiment, these provisioning control data may be provided in a header of the electronic credit token. Advantageously, this allows controlling the communication between the provisioning control apparatus and the provisioning equipment server, for instance, by selecting a secure communication protocol defined by the provisioning control data.

In a further embodiment, the electronic credit token may further comprise data defining one or more validity time periods of the electronic credit token, wherein the processor is configured to prohibit a transmission of the first program code and/or a transmission of the second program code towards the provisioning equipment server outside of the one or more validity time periods. Advantageously, this allows restricting the provisioning of the electronic devices to specific times specified, for instance, by the electronic equipment manufacturer(s).

In a further embodiment, the electronic credit token may further comprise a token identifier for identifying the electronic credit token, wherein the provisioning control apparatus further comprises an electronic memory, wherein the electronic memory is configured to store the token identifier in a list of electronic credit tokens already used or in use. Advantageously, this allows protecting the provisioning control apparatus against a replay attack, i.e. an attack, where an already used electronic credit token is provided again for provisioning electronic devices. In an embodiment, the token identifier may be a nonce generated when generating the electronic credit token.

In a further embodiment, the electronic credit token may further comprise one or more electronic device type identifiers, wherein the processor is configured to prohibit a transmission of the first program code and/or a transmission of the second program code towards the provisioning equipment server for provisioning an electronic device not corresponding to the one or more electronic device types identified by the one or more electronic device type identifiers. Advantageously, this allows making sure that only the intended electronic devices are provisioned with the first and/or second program codes using the electronic credit token. The electronic device type identifier may be, for instance, an identifier of a specific chip or microprocessor type.

In a further embodiment, the electronic credit token may further comprise one or more program code identifiers, e.g. a first program code identifier and a second program code identifier, wherein the processor is configured to prohibit a transmission of the first program code towards the provisioning equipment server, if the first program code differs from the program code(s) identified by the one or more program code identifiers, and wherein the processor is configured to prohibit a transmission of the second program code towards the provisioning equipment server, if the second program code differs from the program code(s) identified by the one or more program code identifiers. Advantageously, this allows making sure that only the intended program code(s), e.g. firmware(s) is used for provisioning electronic devices by the provisioning equipment server.

In a further embodiment, the communication interface is configured to receive the electronic credit token in encrypted form, wherein the processor is configured to decrypt the encrypted electronic credit token. A hybrid encryption scheme, such as PKCS#7, may be used. Advantageously, this allows preventing a malicious party from using an intercepted electronic credit token.

In a further embodiment, the electronic credit token comprises a digital signature based on a private key of a token generator server, wherein the processor is configured to verify the digital signature of the electronic credit token using a public key of the token generator server. Advantageously, this allows the provisioning control apparatus to verify that the electronic credit token initially has been generated by a trustworthy source, namely the token generator server.

In a further embodiment, the communication interface is further configured to receive an electronic provisioning token, wherein the electronic provisioning token comprises a provisioning counter and wherein the provisioning counter indicates a total number of allowable transmissions of the first program code towards the provisioning equipment server. The processor is further configured to retrieve the provisioning counter from the received electronic provisioning token. The communication interface is further configured to transmit the first program code towards the provisioning equipment server, wherein the processor is further configured to update a value of the provisioning counter for each transmission of the first program code towards the provisioning equipment server to obtain an updated provisioning counter. Moreover, the processor is configured to prohibit a further transmission of the first program code towards the provisioning equipment server, if the updated provisioning counter indicates that the total number of transmissions has been reached. Advantageously, by means of the electronic provisioning token the provisioning control apparatus has control over the provisioning of electronic devices by the provisioning equipment server using the first program code, which may be the program code of a first electronic equipment manufacturer. Thereby, the first electronic equipment manufacturer can have remote control via the provisioning control apparatus over the number of electronic devices provisioned by the provisioning equipment server with its program code, e.g. firmware. In addition or alternatively to the electronic provisioning token tied to the first program code and, thus, a first electronic equipment manufacturer the provisioning control apparatus may receive and use a corresponding further electronic provisioning token tied to the second program code and, thus, a second electronic equipment manufacturer.

According to a second aspect the invention relates to a provisioning control system comprising: a provisioning control apparatus according to the first aspect of the invention; a provisioning equipment server being electrically connectable with one or more electronic devices for provisioning the one or more electronic devices with a first program code or a second program code, wherein the provisioning control apparatus is coupled to the provisioning equipment server for controlling the provisioning of the one or more electronic devices; and a token generator server configured to generate the electronic credit token.

In a further embodiment of the system according to the second aspect, the token generator server may be configured to generate the electronic credit token in response to a token request from a remote server, i.e. the remote server of the first or second electronic equipment manufacturer. Advantageously, this allows the token generator server to generate and provide the electronic credit token on demand. In response to the request the token generator server may provide the generated electronic credit token to the remote server, which, in turn, may forward the generated electronic credit token to the provisioning control apparatus. Alternatively, the token generator server may provide the generated electronic credit token directly to the provisioning control apparatus.

In a further embodiment of the system according to the second aspect, the token generator server is configured to verify a digital signature of the token request using a public key of the remote server, before providing the electronic credit token to the remote server. Advantageously, this allows the token generator server to verify the remote server to be trustworthy.

In a further embodiment of the system according to the second aspect, the token generator server is configured to digitally sign the electronic credit token using a private key. Advantageously, this allows the provisioning control apparatus to verify that the electronic credit token has been generated by a trustworthy source.

According to a third aspect the invention relates to a corresponding method for provisioning one or more electronic devices with a first program code or a second program code. The method comprises the steps of:
  receiving an electronic credit token, wherein the electronic credit token comprises a credit counter and wherein the credit counter indicates a total number of transmissions of the first program code and the second program code towards a provisioning equipment server;
  retrieving the credit counter from the received electronic credit token;
  transmitting the first program code or the second program code towards the provisioning equipment server;
  updating a value of the credit counter for each transmission of the first program code and of the second program code to obtain an updated credit counter; and
  prohibiting a further transmission of the first program code and the second program code towards the provisioning equipment server, if the updated credit counter indicates that the total number of transmissions has been reached.

The provisioning control method according to the third aspect of the invention can be performed by the provisioning control apparatus according to the first aspect of the invention and the provisioning control system according to the second aspect of the invention. Further features of the provisioning control method according to the third aspect of the invention result directly from the functionality of the provisioning control apparatus according to the first aspect of the invention, the provisioning control system according to the second aspect of the invention and their different implementation forms described above and below.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
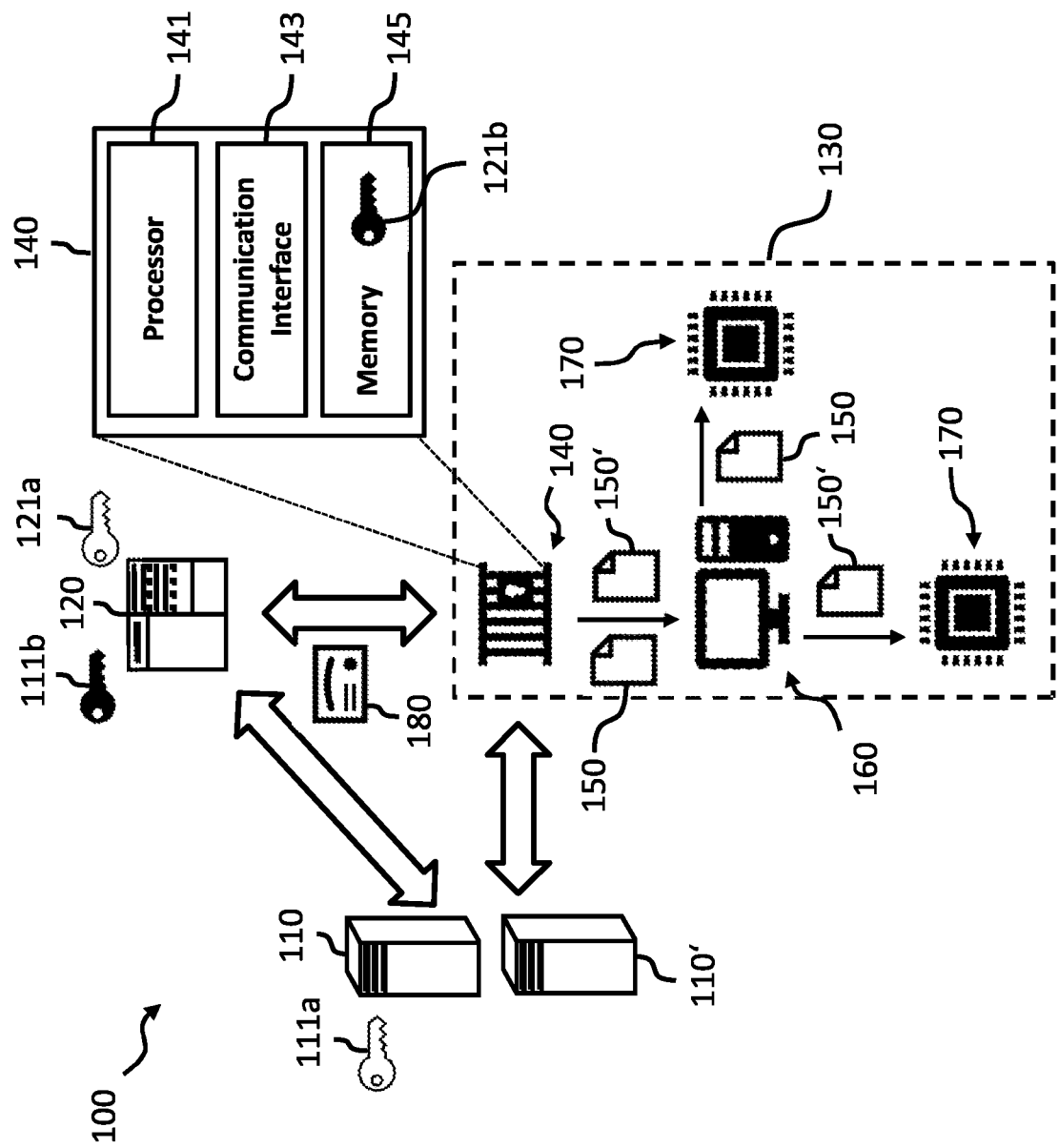
FIG. 1 shows a schematic diagram illustrating a provisioning control system according to an embodiment of the invention, including a provisioning control apparatus according to an embodiment of the invention.

FIG. 1 shows a schematic diagram of a provisioning control system 100 according to an embodiment of the invention, including a provisioning control apparatus 140 according to an embodiment of the invention. As will be described in more detail further below, the provisioning control system 100 may comprise in addition to the provisioning control apparatus 140 a first remote server 110, a second remote server 110', a token generator server 120 and a provisioning equipment server 160 for provisioning or personalizing electronic devices 170, such as chips or microprocessors 170 with a first program code 150, e.g. a first firmware 150, and a second program code 150', e.g. a second firmware 150'.

As illustrated in FIG. 1, the provisioning control apparatus 140, the remote servers 110, 110' and the token generator server 120 may be configured to communicate with each other via a communication network, such as the Internet. Thus, the provisioning control apparatus 140, the remote servers 110, 110' and the token generator server 120 may be at different locations and under the control of different parties. As illustrated in FIG. 1, the provisioning control apparatus 140 and the provisioning equipment server 160 may be located within a production environment 130, such as a personalization factory 130. In an embodiment, the first remote server 110 may be under the control or associated with a first electronic equipment manufacturer, e.g. a first OEM, wherein the first electronic equipment manufacturer assembles electronic equipment, such as smartphones, tablet computers or other types of IoT or electronic consumer equipment, using the electronic devices 170 provisioned by the provisioning equipment server 160 with the first program code 150. Likewise, the second remote server 110' may be under the control or associated with a different second electronic equipment manufacturer, e.g. a second OEM, wherein the second electronic equipment manufacturer assembles electronic equipment, such as smartphones, tablet computers or other types of IoT or electronic consumer equipment, using the electronic devices 170 provisioned by the provisioning equipment server 160 with the second program code 150'.

In an embodiment, the first program code 150 may be a firmware of the first electronic equipment manufacturer associated with the first remote server 110. Likewise, the second program code 150' may be a firmware of the second electronic equipment manufacturer associated with the second remote server 110'.

In an embodiment, the provisioning control apparatus 140, the remote servers 110, 110' and the token generator server 120 are configured to securely communicate with each other using one or more cryptographic schemes, such as a public key infrastructure and/or a hybrid cryptographic scheme.

The provisioning control apparatus 140 is configured to be coupled to the provisioning equipment server 160, for instance, by a wired or a wireless connection. In an embodiment, the provisioning equipment server 160 may be implemented as a personal computer and the provisioning control apparatus 140 may be implemented as a PC card inserted in the provisioning equipment server 160. The provisioning equipment server 160 may comprise an electrical and/or mechanical interface for interacting directly or indirectly via a provisioning equipment with the electronic devices 170. For instance, the provisioning equipment server 160 may comprise a personalization tray for personalizing a batch of electronic devices 170 inserted therein.

In the embodiment illustrated in FIG. 1 the provisioning control apparatus 140 comprises a processor 141, a communication interface 143 and a non-transient memory 145. The communication interface 143 of the provisioning control apparatus 140 is configured to receive an electronic credit token 180. In an embodiment, the electronic credit token 180 is generated by the token generator server 120. In an embodiment, the token generator server 120 may be configured to generate the electronic credit token 180 in response to a token request from the first remote server 110 associated with the first electronic equipment manufacturer or the second remote server 110' associated with the second electronic equipment manufacturer. Advantageously, this allows the token generator server 120 to generate and provide the electronic credit token 180 on demand, i.e. when the first or second electronic equipment manufacturer wants to obtain electronic devices 170 provisioned with the first or second program code 150, 150' for assembling electronic equipment.

In response to the request the token generator server 120 may provide the generated electronic credit token 180 to the requesting remote server 110, 110', which, in turn, may forward the generated electronic credit token 180 to the provisioning control apparatus 140. In a further embodiment, the token generator server 120 may provide the generated electronic credit token 180 directly to the provisioning control apparatus 140.

In an embodiment, the communication interface 143 of the provisioning control apparatus 140 is configured to receive the electronic credit token 180 in encrypted form, wherein the processor 141 is configured to decrypt the encrypted electronic credit token 180. For instance, a hybrid encryption scheme, such as PKCS#7, may be used. Advantageously, this allows preventing a malicious party from successfully using an intercepted electronic credit token 180 for controlling the provisioning of electronic devices by the provisioning equipment server 160.

Figure 2:
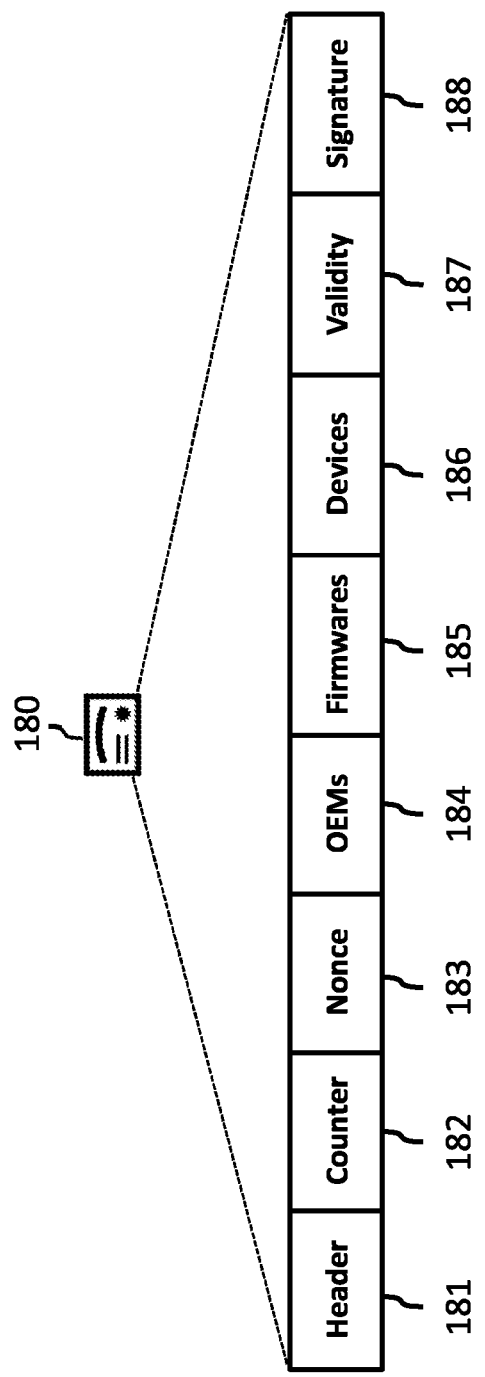
FIG. 2 shows a schematic diagram illustrating an exemplary electronic credit token used by the provisioning control apparatus of FIG. 1.

In an embodiment, the electronic credit token 180 comprises a digital signature 188 (as illustrated in FIG. 2) based on a private key 121*a* of the token generator server 120, wherein the processor 141 of the provisioning control apparatus 140 is configured to verify the digital signature 188 of the electronic credit token 180 using a public key 121*b* of the token generator server 120. Advantageously, this allows the provisioning control apparatus 140 to verify that the electronic credit token 180 initially has been generated by a trustworthy source, namely the token generator server 120. As illustrated in FIG. 1, the public key 121*b* of the token generator server 120 may be stored in the memory 145 of the provisioning control apparatus 140.

As further illustrated in FIG. 2, the electronic credit token 180 comprises a credit counter 182 indicating a total number of allowed transmissions of the first program code 150 and the second program code 150' towards the provisioning equipment server 160. Once received by the communication interface 143, the processor 141 of the provisioning control apparatus 140 is configured to retrieve the credit counter 182 from the received electronic credit token 180, i.e. the total number of allowed transmissions of the first program code 150 and the second program code 150' via the communication interface 143 to the provisioning equipment server 160. For each transmission of the first program code 150 or the second program code 150' via the communication interface 143 to the provisioning equipment server 160 the processor 141 of the provisioning control apparatus 140 is configured to update the value of the credit counter 182 and to obtain an updated value of the credit counter 182. For instance, the processor 141 may be configured to decrement the current value of the credit counter 182 by one for each transmission of the first program code 150 or the second program code 150' via the communication interface 143 to the provisioning equipment server 160.

The processor 141 of the provisioning control apparatus 140 is further configured to prohibit a further transmission of the first program code 150 or the second program code 150' to the provisioning equipment server 160, if the updated value of the credit counter 182 indicates that the total number of transmissions has been reached. In other words, once the total number of electronic devices 170 (as indicated by the initial credit counter 182) have been provisioned with the first program code 150 or the second program code 150' by the provisioning equipment server 160, the provisioning control apparatus 140 blocks the provisioning of further electronic devices 170 with the first program code 150 or the second program code 150' by the provision equipment server 160. In an embodiment, each instance of the first program code 150 and/or the second program code 150' may be digitally signed and/or personalized for only one respective electronic device 170, such as by means of a unique firmware identifier. In an embodiment, the first program code 150 may be provided to the provisioning control apparatus 140 by the first remote server 110 associated with the first electronic equipment manufacturer and the second program code 150' may be provided to the provisioning control apparatus 140 by the second remote server 110' associated with the second electronic equipment manufacturer.

As illustrated in FIG. 2, in addition to the credit counter 182 the electronic credit token 180 may comprise further data, such as provisioning control data 181 for controlling communications with the provisioning equipment server 160. The processor 141 may be configured to retrieve the provisioning control data 181 from the electronic credit token 180 and to control communications of the communication interface 143 with the provisioning equipment server 160 according to the provisioning control data 181. As illustrated in FIG. 2, these provisioning control data 181 may be provided in a header 181 of the electronic credit token 180. Advantageously, this allows controlling the communication between the provisioning control apparatus 140 and the provisioning equipment server 160, for instance, by selecting a secure communication protocol on the basis of the provisioning control data 181.

Moreover, the electronic credit token 180 may comprise data 187 defining one or more validity time periods of the electronic credit token 180. The processor 141 may be configured to prohibit a transmission of the first program code 150 and/or the second program code 150' towards the provisioning equipment server 160 outside of the one or more validity time periods. Advantageously, this allows restricting the provisioning of the electronic devices 170 with the first program code 150 and/or the second program code 150' to specific times specified, for instance, by the first electronic equipment manufacturer, the second electronic equipment manufacturer and/or the token generator server 120.

Furthermore, the electronic credit token 180 may comprise a token identifier 183 for uniquely identifying the electronic credit token 180, wherein the electronic memory 145 of the provisioning control apparatus 140 is configured to store the token identifier 183 in a list (i.e. a black list) of electronic credit tokens 180 already used or in use. Advantageously, this allows protecting the provisioning control apparatus 140 against a replay attack, i.e. an attack, where an already used electronic credit token is provided again for provisioning electronic devices. In an embodiment, the token identifier 183 may be a nonce 183 generated by the token generator server 120 when generating the electronic credit token 180.

As illustrated in FIG. 2, the electronic credit token 180 may further comprise one or more electronic device type identifiers 186. The processor 141 may be configured to prohibit a transmission of the first program code 150 and/or the second program code 150' towards the provisioning equipment server 160 for provisioning an electronic device 170 not corresponding to the one or more electronic device types identified by the one or more electronic device type identifiers 186. Advantageously, this allows making sure that only the intended electronic devices 170 are provisioned with the first program code 150 and/or the second program code 150' using the electronic credit token 180. The one or more electronic device type identifiers 186 may include, for instance, an identifier of a specific chip or microprocessor type.

Moreover, the electronic credit token 180 may further comprise one or more program code identifiers 185, including a first program code identifier and a second program code identifier. The processor 141 may be configured to prohibit a transmission of the first program code 150 and/or the second program code 150' towards the provisioning equipment server 160, if the first program code 150 and/or the second program code 150' differs from the one more program codes identified by the one or more program code identifiers 185. Advantageously, this allows making sure that only the intended program codes, e.g. firmware 150, 150' are used for provisioning the electronic devices 170. As illustrated in FIG. 2, the electronic credit token 180 may further comprise one or more identifiers 184 for identifying the first electronic equipment manufacturer and/or the second electronic equipment manufacturer.

In an embodiment, the communication interface 143 of the provisioning control apparatus 140 is further configured to receive an electronic provisioning token, wherein the electronic provisioning token comprises a provisioning counter indicating a total number of transmissions of the first program code 150 only. In an embodiment, the communication interface 143 of the provisioning control apparatus 140 is further configured to receive a further electronic provisioning token, wherein the further electronic provisioning token comprises a further provisioning counter indicating a total number of transmissions of the second program code 150' only.

The processor 141 of the provisioning control apparatus 140 is configured to retrieve the provisioning counter from the received electronic provisioning token. The communication interface 143 is further configured to transmit the first program code 150 towards the provisioning equipment server 160, wherein the processor 141 is configured to update a value of the provisioning counter for each transmission of the first program code 150 to obtain an updated provisioning counter. The processor 141 is configured to prohibit a further transmission of the first program code 150 (but not of the second program code 150') towards the provisioning equipment server 160, if the updated provisioning counter indicates that the total number of transmissions has been reached. Advantageously, this allows the provisioning control apparatus 140 to keep control over the number of electronic devices 170 provisioned by the provisioning equipment server 160 with a specific program code, e.g. the first program code 150, and, thus, for a specific customer, e.g. the first electronic equipment manager associated with the first remote server 110.

Figure 3:
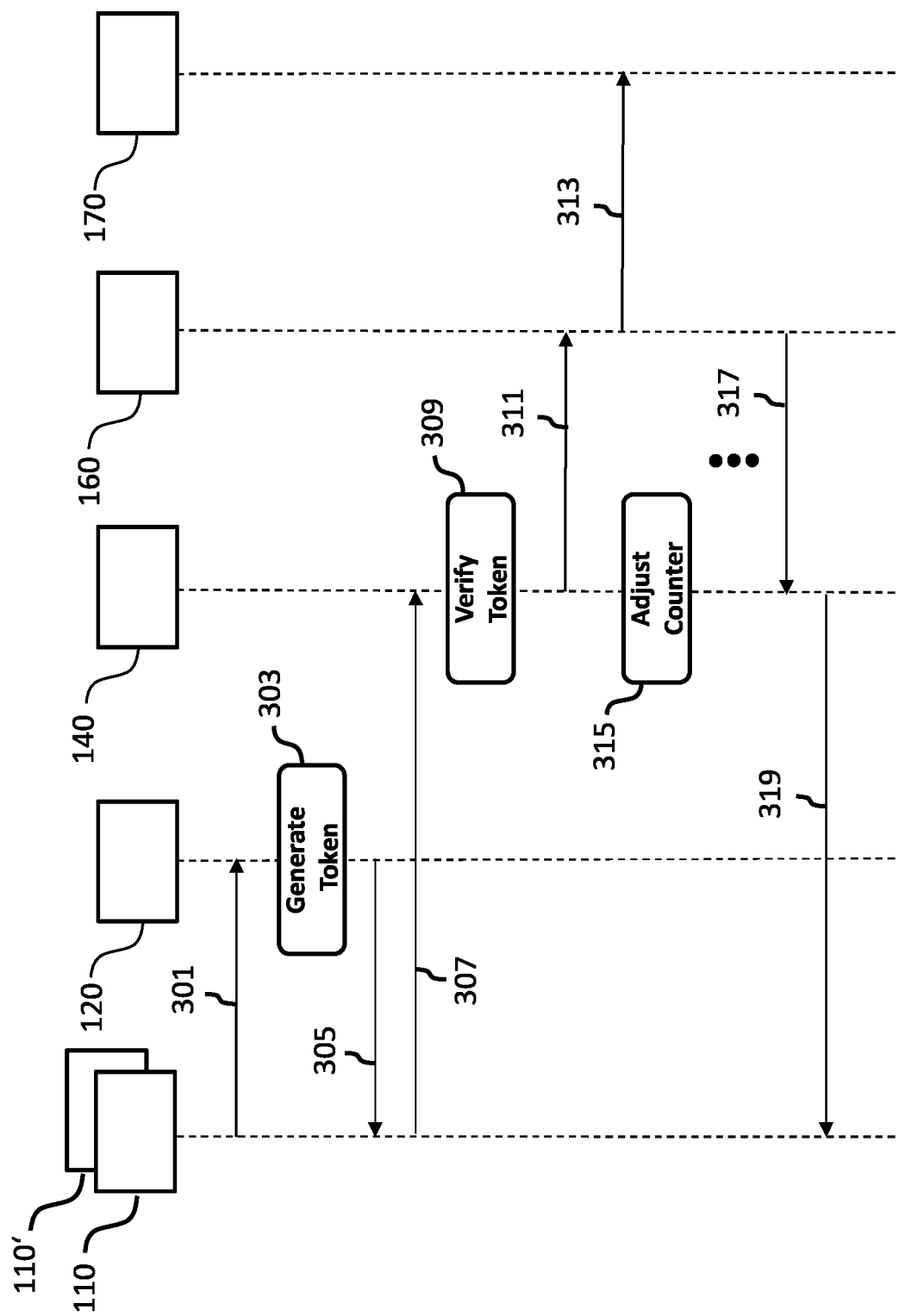
FIG. 3 shows a signaling diagram illustrating the interaction of the provisioning control apparatus of FIG. 1 with the other components of the provisioning control system of FIG. 1.

FIG. 3 shows a signaling diagram illustrating the interaction of the provisioning control apparatus 140 with the other components of the provisioning control system 100, i.e. the remote servers 110, 110', the token generator server 120, the provisioning equipment server 160 and the electronic device(s) 170 to be provisioned. In FIG. 3 the following steps are illustrated, some of which already have been described in the context of FIG. 1 above.

In step 301 of FIG. 3, by way of example the first remote server 110 (associated, for instance, with a specific electronic equipment manufacturer) sends a token request to the token generator server 120 (the request may be also send by the second remote server 110', however, in the following the scenario will be described by way of example in the context of the first remote server 110). The token request may be digitally signed by the first remote server 110 using a private key 111*a*. Thus, the token generator server 120 may be configured to verify the digital signature of the token request using a public key 111*b* of the first remote server 110, before providing the electronic credit token 180 to the first remote server 110. Advantageously, this allows the token generator server 120 to verify the first remote server 110 to be trustworthy.

In response to the request of step 301 the token generator server 120 in step 303 of FIG. 3 generates an electronic credit token 180. In addition to the credit counter 182 the electronic credit token 180 may comprise one or more of the data elements illustrated in FIG. 2, as already described above. In an embodiment, the token generator server 120 is configured to digitally sign the electronic credit token 180 using the private key 121*a*.

In step 305 the token generator server 120 provides the electronic credit token 180 to the first remote server 110, which, in turn, forwards the electronic credit token 180 to the provisioning control apparatus 140 (step 307 of FIG. 3). Once received the provisioning control apparatus 140 verifies the electronic credit token 180 in step 309 of FIG. 3, for instance, by verifying the digital signature 188 of the electronic credit token 180 using the public key 121b of the token generator server 120.

If this verification is successful, the provisioning control apparatus 140 provides a personalized first program code 150 and/or a personalized second program code 150' to the provisioning equipment server 160 (step 311 of FIG. 3), which, in turn, uses the personalized program code(s) 150, 150' for provisioning an electronic device 170 (step 313 of FIG. 3). For each transmission of a personalized program code 150, 150' the provisioning control apparatus 140 adjusts (step 315 of FIG. 3) the value of the credit counter 182. This provisioning of the electronic devices 170 continues until the total number of allowed electronic devices 170 has been provisioned by the provisioning equipment server 160. In step 317 of FIG. 3, the provisioning equipment server 160 sends a corresponding report to the provisioning control apparatus 140. At this stage, the provisioning control apparatus 140 will block any further transmissions of personalized first or second program code 150, 150' to the provisioning equipment server 160 and, thus, block the personalized provisioning of any further electronic devices 170, be it for the first electronic equipment manufacturer or be it for the second electronic equipment manufacturer.

In step 319 of FIG. 3 the provisioning control apparatus 140 reports to the first remote server 110 associated with the first electronic equipment manufacturer that the total number of electronic devices 170 (as indicated by the initial credit counter 182 of the electronic credit token 180) have been provisioned with a respective personalized program code 150, 150'. This may trigger the first remote server 110 to provide a further electronic credit token to the provisioning control apparatus 140 and/or to request a new electronic credit token from the token generator server 120.

Figure 4:
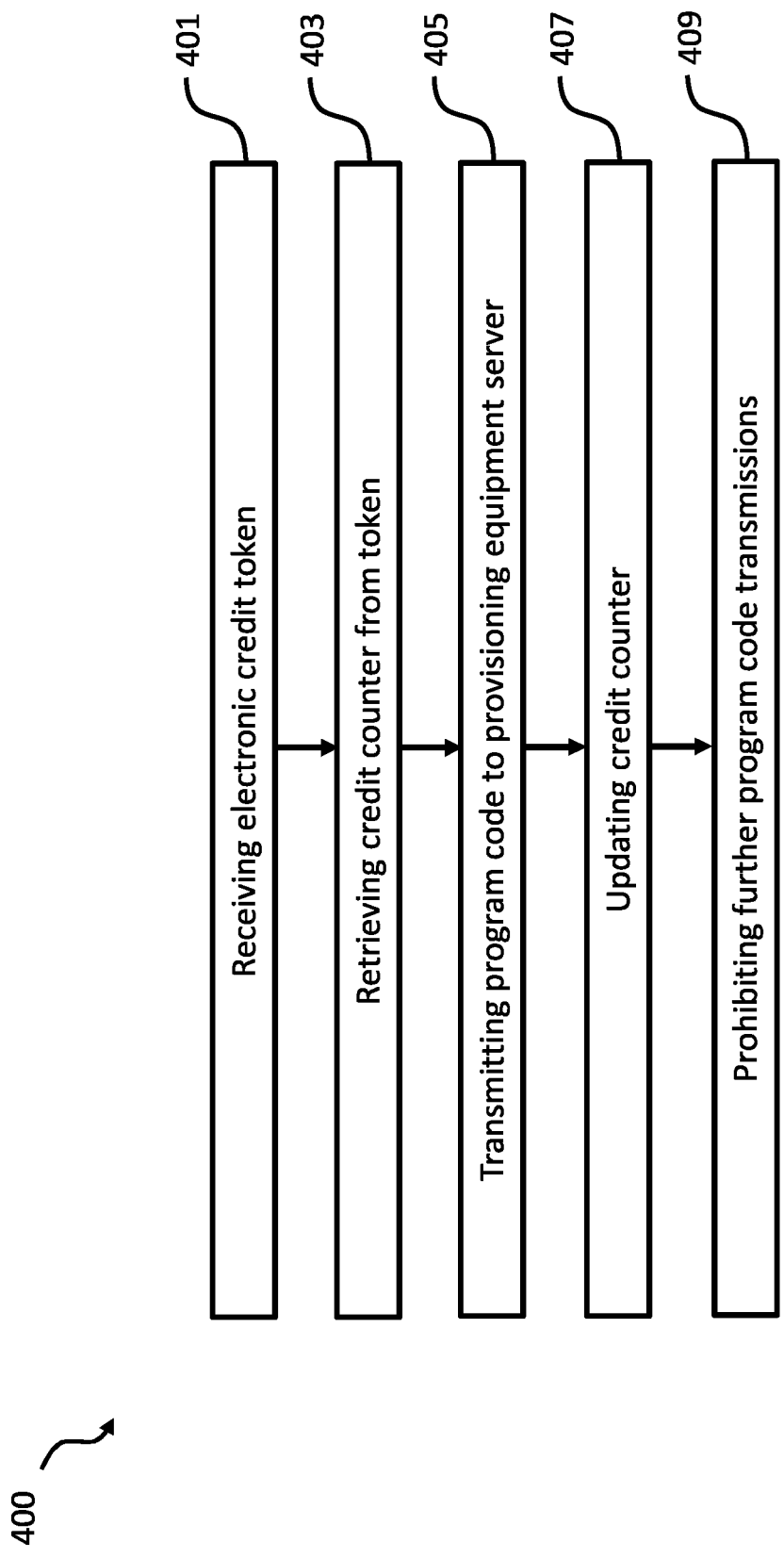
FIG. 4 shows a flow diagram illustrating steps of a provisioning control method according to an embodiment of the invention.

FIG. 4 shows a flow diagram illustrating steps of a correspond provisioning control method 400 according to an embodiment of the invention. The provisioning control method 400 according to an embodiment of the invention comprises the following steps:

Step 401: receiving the electronic credit token 180, wherein the electronic credit token comprises the credit counter 182 and wherein the credit counter 182 indicates a total number of transmissions of the first program code 150 and the second program code 150' towards the provisioning equipment server 160, wherein the provisioning equipment server 160 is electrically connectable with the one or more electronic devices 170 for provisioning the one or more electronic devices 170 with the first program code 150 or the second program code 150'.

Step 403: retrieving the credit counter 182 from the received electronic credit token 180.

Step 405: transmitting the first program code 150 or the second program code 150' towards the provisioning equipment server 160.

Step 407: updating a value of the credit counter 182 for each transmission of the first program code 150 and of the second program code 150' to obtain an updated credit counter 182.

Step 409: prohibiting a further transmission of the first program code 150 or the second program code 150' towards the provisioning equipment server 160, if the updated credit counter 182 indicates that the total number of transmissions has been reached.

As will be appreciated, embodiments of the invention provide a higher flexibility with respect to the secure production and personalization of electronic devices and equipment. Moreover, embodiments of the invention allow delegating secure production of electronic devices and components for electronic equipment. Moreover, embodiments of the invention allow load balancing and on-demand production/personalization of security critical systems.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A provisioning control system comprising:
   a provisioning control apparatus;
   a provisioning equipment server being electrically connectable with one or more electronic devices for provisioning the one or more electronic devices with a first program code or a second program code, wherein the provisioning control apparatus is under control of and configured to receive control communications from a first party and the provisioning equipment server is under control of and configured to receive control communications from a second party, the first party being different than the second party,
wherein the first program code is provided to the provisioning control apparatus by a first remote server associated with a first electronic equipment manufacturer,
wherein the second program code is provided to the provisioning control apparatus by a second remote server associated with a second electronic equipment manufacturer,
wherein the first and second program codes are personalized first and second program codes for provisioning one respective electronic device,
wherein the provisioning control apparatus is coupled to the provisioning equipment server and controls the provisioning of the one or more electronic devices; and
a token generator server configured to generate an electronic credit token;
wherein the provisioning control apparatus comprises:
a communication interface configured to receive the electronic credit token over a communication network from the first remote server, wherein the electronic credit token comprises a credit counter indicating a total number of the one or more electronic devices to be provisioned with the first program code or the second program code, the credit counter further indicating a total number of transmissions of the first program code and the second program code towards the provisioning equipment server; and
a processor configured to retrieve the credit counter from the received electronic credit token;
wherein the communication interface is further configured to transmit the first program code and the second program code towards the provisioning equipment server;
wherein the processor is further configured to update a value of the credit counter for each transmission of the first program code and of the second program code to obtain an updated credit counter;
wherein the processor is configured to prohibit a further transmission of the first program code and the second program code towards the provisioning equipment server if the updated credit counter indicates that the total number of transmissions of the first program code and the second program code towards the provisioning equipment server has been reached;
wherein in addition to the credit counter the electronic credit token comprises provisioning control data as further data, which provisioning control data controls communications between the provisioning control apparatus and the provisioning equipment server, wherein the provisioning control data define a secure communication protocol, said controlling the communications between the provisioning control apparatus and the provisioning equipment server being performed by selecting the secure communication protocol on the basis of the provisioning control data, and wherein the processor is configured to retrieve the provisioning control data from the electronic credit token and to control communications of the communication interface with the provisioning equipment server according to the provisioning control data, the provisioning control data being provided in a header of the electronic credit token.

2. The provisioning control system of claim 1, wherein the communication interface is configured to communicate with the provisioning equipment server via a wired connection.

3. The provisioning control system of claim 1, wherein the electronic credit token further comprises data defining one or more validity time periods of the electronic credit token and wherein the processor is configured to prohibit a transmission of the first program code and/or the second program code towards the provisioning equipment server outside of the one or more validity time periods.

4. The provisioning control system of claim 1, wherein the electronic credit token further comprises a token identifier for identifying the electronic credit token and wherein the provisioning control apparatus further comprises an electronic memory, wherein the electronic memory is configured to store the token identifier in a list of electronic credit tokens already used or in use.

5. The provisioning control system of claim 1, wherein the electronic credit token comprises an electronic device type identifier and wherein the processor is configured to prohibit a transmission of the first program code and the second program code towards the provisioning equipment server for provisioning an electronic device not corresponding to the electronic device type identified by the electronic device type identifier.

6. The provisioning control system of claim 1, wherein the electronic credit token further comprises a first program code identifier and a second program code identifier and wherein the processor is configured to prohibit a transmission of the first program code towards the provisioning equipment server, if the first program code differs from the program code identified by the first program code identifier, and to prohibit a transmission of the second program code towards the provisioning equipment server, if the second program code differs from the program code identified by the second program code identifier.

7. The provisioning control system of claim 1, wherein the communication interface is configured to receive the electronic credit token in encrypted form and wherein the processor is configured to decrypt the encrypted electronic credit token.

8. The provisioning control system of claim 1, wherein the electronic credit token comprises a digital signature based on a private key of a token generator server and wherein the processor is configured to verify the digital signature of the electronic credit token using a public key of the token generator server.

9. The provisioning control system of claim 1, wherein the communication interface is further configured to receive an electronic provisioning token, wherein the electronic provisioning token comprises a provisioning counter, the provisioning counter indicating a total number of transmissions of the first or second program code towards the provisioning equipment server;
wherein the processor is further configured to retrieve the provisioning counter from the received electronic provisioning token;
wherein the communication interface is further configured to transmit the respective first or second program code towards the provisioning equipment server;
wherein the processor is further configured to update a value of the provisioning counter for each transmission of the respective first or second program code to obtain an updated provisioning counter; and
wherein the processor is configured to prohibit a further transmission of the respective first or second program code towards the provisioning equipment server if the updated provisioning counter indicates that the total number of transmissions has been reached.

10. The provisioning control system of claim 1, wherein the token generator server is configured to generate the electronic credit token in response to a token request from a remote server.

11. The provisioning control system of claim 1, wherein the token generator server is configured to verify a digital signature of the token request using a public key of the remote server, before providing the electronic credit token to the remote server or the provisioning control apparatus.

12. The provisioning control system of claim 1, wherein the token generator server is configured to digitally sign the electronic credit token using a private key.

13. A method for provisioning one or more electronic devices with a first program code or a second program code, wherein the method comprises:
  generating an electronic credit token by a token generator server;
  receiving the electronic credit token by a communication interface of a provisioning control apparatus,
    wherein the electronic credit token comprises a credit counter, the credit counter indicating a total number of the one or more electronic devices to be provisioned with the first program code or the second program code and further indicating a total number of transmissions of the first program code and the second program code towards a provisioning equipment server,
    the provisioning control apparatus is under control of and configured to receive control communications from a first party and the provisioning equipment server is under control of and configured to receive control communications from a second party, the first party being different than the second party,
    wherein the provisioning equipment server is electrically connectable with the one or more electronic devices for provisioning the one or more electronic devices with the first program code or the second program code, the first program code being provided to the provisioning control apparatus by a first remote server associated with a first electronic equipment manufacturer, and the second program code being provided to the provisioning control apparatus by a second remote server associated with a second electronic equipment manufacturer,
    wherein the first and second program codes are personalized first and second program codes for provisioning one respective electronic device,
    wherein in addition to the credit counter the electronic credit token comprises provisioning control data as further data, which provisioning control data controls communications between the provisioning control apparatus and the provisioning equipment server, the provisioning control data being provided in a header of the electronic credit token;
  retrieving the provisioning control data from the electronic credit token by a processor of the provisioning control apparatus;
  retrieving the credit counter from the received electronic credit token by the processor of the provisioning control apparatus;
  controlling communications of the communication interface of the provisioning control apparatus with the provisioning equipment server according to the provisioning control data defining a secure communication protocol, said controlling the communications between the provisioning control apparatus and the provisioning equipment server being performed by selecting the secure communication protocol on the basis of the provisioning control data;
  transmitting the first program code or the second program code towards the provisioning equipment server by the communication interface of the provisioning control apparatus;
  updating a value of the credit counter for each transmission of the first program code and of the second program code to obtain an updated credit counter by the processor of the provisioning control apparatus; and
  prohibiting a further transmission of the first program code and the second program code towards the provisioning equipment server by the processor of the provisioning control apparatus if the updated credit counter indicates that the total number of transmissions of the first program code and the second program code towards the provisioning equipment server has been reached.

14. The provisioning control system of claim 1, wherein the provisioning equipment server is configured to provision a first type of electronic devices using the first program code for a first party and a second type of electronic devices using the second program code for a second party, the second party being independent of the first party.

15. The provisioning control system of claim 1, wherein the provisioning equipment server is implemented as a personal computer.

16. The provisioning control system of claim 1, wherein the provisioning control apparatus is implemented as a PC card inserted in the provisioning equipment server.

17. The provisioning control system of claim 1, wherein the token generator server is configured to generate the electronic credit token in response to a token request from the first remote server associated with the first electronic equipment manufacturer and/or the second remote server associated with the second electronic equipment manufacturer.

18. The provisioning control system of claim 1, wherein the first program code is a first firmware originally provided by the first remote server, and wherein the second program code is a second firmware originally provided by the second remote server.

19. The provisioning control system of claim 1, wherein the provisioning control data enables a secured provisioning of the one or more electronic devices for a respective electronic equipment manufacturer.

20. The provisioning control system of claim 3, wherein the one or more validity time periods of the electronic credit token restrict the provisioning of the electronic devices with the first program code and/or the second program code to specific times specified by the first electronic equipment manufacturer and/or the second electronic equipment manufacturer.

* * * * *